United States Patent
Koosmann

(10) Patent No.: US 10,458,110 B1
(45) Date of Patent: Oct. 29, 2019

(54) DRIVE-OVER TILE INTAKE GUARD

(71) Applicant: Timothy O. Koosmann, Big Stone City, SD (US)

(72) Inventor: Timothy O. Koosmann, Big Stone City, SD (US)

(*) Notice: Subject to any disclaimer, the term of this patent is extended or adjusted under 35 U.S.C. 154(b) by 35 days.

(21) Appl. No.: 15/968,700

(22) Filed: May 1, 2018

Related U.S. Application Data

(60) Provisional application No. 62/492,584, filed on May 1, 2017.

(51) Int. Cl.
| | |
|---|---|
| *E03F 5/06* | (2006.01) |
| *E03F 5/04* | (2006.01) |
| *E03F 1/00* | (2006.01) |
| *B01D 35/02* | (2006.01) |
| *E03F 7/06* | (2006.01) |

(52) U.S. Cl.
CPC ............ *E03F 5/0404* (2013.01); *B01D 35/02* (2013.01); *E03F 1/002* (2013.01); *E03F 5/06* (2013.01); *E03F 7/06* (2013.01)

(58) Field of Classification Search
CPC ..... E03F 1/00; E03F 1/002; E03F 5/04; E03F 5/0404; E03F 5/041; E03F 5/06; E03F 5/14; E03F 7/06; E02B 11/00; B01D 35/02
USPC .......... 210/163, 164, 170.03, 459, 460, 463; 405/36, 42, 125
See application file for complete search history.

(56) References Cited

U.S. PATENT DOCUMENTS

| | | | |
|---|---|---|---|
| 459,259 A * | 9/1891 | Shunk | E03F 5/0404 210/163 |
| 550,032 A * | 11/1895 | Tucker | E03F 5/0404 210/163 |
| 748,201 A | 12/1903 | Miller | |
| 902,104 A | 10/1908 | Neireiter | |
| 906,562 A | 12/1908 | Rue et al. | |
| 999,106 A | 7/1911 | Hagaman et al. | |
| 1,140,903 A | 5/1915 | Johnson | |
| 1,371,143 A | 3/1921 | Bradburn | |
| 1,397,471 A | 11/1921 | Walker | |
| 1,457,637 A | 6/1923 | Sievers | |
| 2,640,593 A * | 6/1953 | Korb | E04D 13/0409 210/463 |
| 2,962,866 A | 12/1960 | Muehlfeld | |
| 2,970,697 A | 2/1961 | Larson et al. | |
| 3,086,655 A | 4/1963 | Compton | |
| 3,121,684 A * | 2/1964 | Bugbird | E04D 13/0409 210/463 |

(Continued)

*Primary Examiner* — Christopher Upton
(74) *Attorney, Agent, or Firm* — Albert W. Watkins

(57) ABSTRACT

A drive-over tile intake guard has a drain tile inlet coupler that rests against the earth surface and does not rise consequentially above the earth. The inlet coupler encompasses and protects the end of a drain tile pipe. A plurality of rods are affixed on a first end to the inlet coupler, and each extend therefrom simultaneously downward into the drain tile and also generally radially toward the center of the tile opening. However, the rods are also each angularly offset from radial to the tile opening center. By angularly offsetting the rods each in the same rotational direction, smaller debris that might block flow through other prior art guards but which will not block the drain tile from functioning will swirl, slip off of the rods and pass into the drain tile, and ultimately be discharged at the outlet end of the drain tile.

16 Claims, 4 Drawing Sheets

(56) References Cited

U.S. PATENT DOCUMENTS

| | | | |
|---|---|---|---|
| 3,385,442 A | | 5/1968 | Swanson |
| 3,472,030 A | | 10/1969 | Rieke |
| 3,587,239 A | | 6/1971 | Feland |
| 3,959,831 A | * | 6/1976 | Hendricks ............... E03C 1/264 210/460 |
| 4,702,828 A | | 10/1987 | Mehmert et al. |
| 5,037,542 A | | 8/1991 | Carroll |
| 5,090,152 A | | 2/1992 | Ling |
| D363,532 S | | 10/1995 | Van Gorp |
| 5,581,934 A | * | 12/1996 | Arnold, Sr. ............... E03F 7/06 210/460 |
| 6,447,206 B1 | | 9/2002 | Fleury |
| 6,487,729 B2 | | 12/2002 | Delanzo |
| 7,108,783 B2 | | 9/2006 | Glazik |
| 7,441,989 B2 | | 10/2008 | Fleming |
| 7,704,386 B2 | | 4/2010 | Ventura |
| 8,657,344 B2 | | 2/2014 | Glazik et al. |
| 9,334,618 B1 | | 5/2016 | Dodd |
| 9,422,693 B2 | | 8/2016 | Johnston et al. |
| 2006/0086672 A1 | | 4/2006 | Goliszewski |
| 2011/0064521 A1 | | 3/2011 | Schafer |

\* cited by examiner

DRIVE-OVER TILE INTAKE GUARD

CROSS REFERENCE TO RELATED APPLICATIONS

The present application claims the benefit of U.S. provisional patent application 62/492,584 filed May 1, 2017 of like title and inventorship, the teachings and entire contents which are incorporated herein by reference.

BACKGROUND OF THE INVENTION

1. Field of the Invention

This invention pertains generally to hydraulic and earth engineering, and more particularly to improved drainage of agricultural fields, residential and commercial properties, roadways, railways, and other lands. In a most preferred manifestation, the present invention pertains to an intake guard cooperative with a surface water inlet into subterranean drainage tile lines.

2. Description of the Related Art

During the spring thaw, many agricultural fields may become flooded. The water is unable to drain into or from the ground at the same rate as the melting occurs. Instead, the water accumulates at low spots or across larger areas of flat land. Similar flooding can occur during heavy rain storms, and other similar events that lead to either fully saturated earth, excessively high local water tables, or the like, thereby preventing adequate drainage of the land. In addition to agricultural fields, residential and commercial properties, roadways, and other lands may similarly be adversely affected.

In the early spring, prior to planting, this local flooding can delay access to the land required to plant an agricultural crop. In many regions, there is a limited window within which to get the crop planted and to still allow adequate time for the crop to grow and fully mature. As a result, a particularly extended wet period may even entirely prevent the planting.

In the later spring, once the crop has been planted but during or shortly after germination, the seeds and plants are very susceptible to too much water, and they will rot. If there is adequate growing season left, the farmer may replant, but obviously at great expense and time.

Even when plants survive the early season high water levels, they may fail to develop sufficiently deep and large root structure, making them weaker and slower growing. Similarly, when the plants are much larger and stronger, particularly extended wet periods can weaken the plants sufficiently to seriously hurt the crop yield. Extended flooding, regardless of the time of year, leads to depleted soil nutrients, which is of course adverse to crop yield.

Problems also exist with high water levels around residential and commercial properties, roadways, and other land areas. Excessive accumulation of water can lead to seepage through foundations into buildings, causing immediate damage or potentially leading to rot, mold and mildew growth. While flooding along most roadways is controlled by open ditches such as adjacent to the shoulders, this is not always possible. Flooded roadways can lead to hydroplaning and loss of control, while flooded ditches and shoulders make the roadways less safe.

In order to prevent or mitigate such local flooding, a number of strategies have been devised. However, none is more prevalent for agricultural, residential, and commercial properties than drain tile. Drain tile was originally named for the ceramic tiles used in the construction, but modern drain tile most commonly uses buried plastic tubes through which water can flow. One or often many inlets may be provided adjacent to the surface of the land to be drained or moisture controlled. These inlets couple directly into the tubing, which then carries the water to some point of lower elevation, such as an open ditch, a pond, creek, stream, or river, or other body of water, or even another land area that may, for exemplary purpose, have better intrinsic drainage either through geography or soil type.

Unfortunately, along with storm water or spring run-off, there may be significant suspended or floating debris. Examples include sticks, leaves, grass, crop residue from the previous growing season, plastic or other trash, or other debris. If this debris is allowed to flow directly into the drain tile with the water, the drain tile will become plugged, and will no longer adequately drain water from the land. Since drain tile must be buried below the surface of the ground, excavation and reinstallation of drain tile is undesirable. Consequently, it is desirable to provide an inlet guard or coarse filter that prevents the inflow of matter that might block the drain tile. This can substantially increase the useful life of the drain tile.

Various artisans have designed different geometries of drain tile, as illustrated in a number of patents. Exemplary U.S. patents and published applications, the teachings which are incorporated herein by reference, include: U.S. Pat. No. 902,104 by Neireiter, entitled "Tile drain inlet"; U.S. Pat. No. 1,140,903 by Johnson, entitled "Land drain"; U.S. Pat. No. 1,371,143 by Bradburn, entitled "Pipe protector"; U.S. Pat. No. 1,457,637 by Sievers, entitled "Device for conducting surface water to drain tiles"; U.S. Pat. No. 2,962,866 by Muehlfeld, entitled "Drain tile guards"; U.S. Pat. No. 2,970,697 by Larson et al, entitled "Retractable swirl plate and vermin control guard for drain tile intakes"; U.S. Pat. No. 3,385,442 by Swanson, entitled "Inlet fitting for drain tiles"; U.S. Pat. No. 3,472,030 by Rieke, entitled "Anti-clogging entrance guard for culverts"; U.S. Pat. No. 3,587,239 by Feland, entitled "Culvert bevelled end construction"; U.S. Pat. No. 4,702,828 by Mehmert et al, entitled "Drain pipe animal guard"; U.S. Pat. No. 5,037,542 by Carroll, entitled "Protective grating with pivoting sections for culvert pipe"; U.S. Pat. No. 6,447,206 by Fleury, entitled "Beaver control screen for culvert pipe"; U.S. Pat. No. 7,108,783 by Glazik, entitled "Drain inlet"; U.S. Pat. No. 7,441,989 by Fleming, entitled "Beaver control device for a culvert pipe"; U.S. Pat. No. 8,657,344 by Glazik et al, entitled "Adjustable assembly for a drain inlet"; U.S. Pat. No. 9,334,618 by Dodd, entitled "Field drain float"; U.S. Pat. No. 9,422,693 by Johnston et al, entitled "Protective device for a culvert pipe"; 2006/0086672 by Goliszewski, entitled "Spring gutter strainer"; 2011/0064521 by Schafer, entitled "Farmable water quality inlet for transporting water from surface to drainage pipe"; and Des U.S. Pat. No. 363,532 by Van Gorp, entitled "Floating valve for drain tile inlet". Of these foregoing patents and published applications, the most common type of drain guard sold and installed for agricultural purposes is the wire type extending out away from the drain tile inlet, such as illustrated by Rieke, Fleury, and Van Gorp. For agricultural field installations, this wire framework will rise above the surface of the earth. While smaller inlet guards may rise above the earth by as little as six inches, most common inlet guards rise up fifteen or eighteen inches. Generally, the larger the diameter of the tile, the taller the inlet guard.

The openings within framework will permit most matter to flow into the drain tile, but larger objects such as sticks and the like that could block the tile are excluded. A plurality of ground anchors may in some of the prior art be provided that allow the inlet guard to be anchored into the ground in alignment with the drain tile inlet.

These prior art inlet guards are quite effective at preventing large debris from entering and potentially blocking the drain tile. Unfortunately, these inlet guards also rise above the surface of the earth significantly. This means that they are vulnerable to contact with farm machinery and livestock, and are readily damaged. As the size of farm machinery increases, the problem only worsens, since it becomes harder and harder for the machine operator to see these relatively small guards, or to either efficiently or accurately avoid them with the large machinery. In addition, during the spraying of a field or at the time of harvest, crops tend to cover or conceal the drain tile inlet guards, making prior art drain tile inlet guards much more difficult to avoid. As a result, all too often a machinery wheel will impact and damage or destroy the inlet guard. Finally, in the case of particularly tall intake guards, harvesters may engage the guard, potentially harming both the guard and the harvester.

These prior art inlet guards also tend to accumulate larger debris, such as sticks and longer straw, grass, and the like, which over time will raise the effective inlet height, or significantly slow the inlet of water during periods of heavy rain and the like. Between the damage from machinery and livestock, and the clogging from larger debris, prior art inlet guards must be regularly maintained and often replaced in order to retain their full effectiveness.

Other artisans have devised various inlet guards that are inserted within the existing drain tile. Exemplary U.S. patents, the teachings which are incorporated herein by reference, include: U.S. Pat. No. 999,106 by Hagaman et al, entitled "Tile and sewer drain protector"; U.S. Pat. No. 748,201 by Miller, entitled "Animal trap"; U.S. Pat. No. 906,562 by Rue et al, entitled "Tile protector"; U.S. Pat. No. 1,397,471 by Walker, entitled "Tile and sewer trap"; U.S. Pat. No. 3,086,655 by Compton, entitled "Hinged guard for drain pipe"; and U.S. Pat. No. 5,090,152 by Ling, entitled "Rodent barrier for pipes". While these inserted guards avoid the risk of collision with farm machinery, they do not resolve the challenges of clogging, and in most cases aggravate the issue. This is because in the case of the above ground guards, the water may simply rise above the clog that will generally form first in the region most adjacent to the ground. At some height, the water will then climb above the clogging debris, and flow through the external guard. While the external guard will still eventually clog, it will be apparent that this can take much longer than an internal guard fitted within the drain tile. Another limitation of the internal guards is the risk of damage to either the guard or livestock. In the event a cow or other large animal were to accidentally step into the drain tile, many of these internal guards will either be destroyed, or will risk capturing the livestock hoof. Either outcome is very undesirable.

A few additional patents of varying relevance, the relevant teachings and contents which are incorporated herein by reference, include: U.S. Pat. No. 6,487,729 by Delanzo, entitled "Hair trap for drains and sinks"; and U.S. Pat. No. 7,704,386 by Ventura, entitled "Filter assembly".

In addition to the foregoing patents, Webster's New Universal Unabridged Dictionary, Second Edition copyright 1983, is incorporated herein by reference in entirety for the definitions of words and terms used herein.

As may be apparent then, in spite of the enormous advancements and substantial research and development that has been conducted, there still remains a need for ain improved drain tile guard.

SUMMARY OF THE INVENTION

In a first manifestation, the invention is a drive-over tile intake guard configured to protect an inlet into a longitudinally extensive drain tile pipe. A drain tile inlet coupler is configured for earth insertion adjacent to the drain tile pipe inlet. Each one of a plurality of inlet guard rods terminate at a first end affixed with and protruding interiorly from the drain tile inlet coupler and terminate at a second end distal to the first end, and have a downward sloping portion between the first end and the second end. The downward sloping portion of each one of the plurality of inlet guard rods is configured to displace the second end relatively more interior within a drain tile inlet. The downward sloping portion of each one of the plurality of inlet guard rods is additionally angularly offset from extending toward a longitudinal center line within the drain tile inlet coupler. Each one of the plurality of inlet guard rod downward sloping portions have an offset angle relative to a radial axis of a like direction and magnitude.

In a second manifestation, the invention is a drive-over tile intake guard. A drain tile inlet coupler defines a longitudinal center line within the drain tile inlet coupler and has an annular sleeve configured for earth insertion adjacent to a drain tile pipe inlet and has a flange configured to rest upon an earth surface adjacent to the drain tile pipe inlet. A first inlet guard rod terminates at a first end affixed with and protruding interiorly from the drain tile inlet coupler annular sleeve and terminates at a second end distal to the first end. A sloping portion between the first end and said second end is offset from a radial axis both in a downward direction and also offset from extending directly toward the longitudinal center line. A second inlet guard rod terminates at a first end affixed with and protruding interiorly from the drain tile inlet coupler annular sleeve and terminates at a second end distal to the first end. A sloping portion between the first end and second end is offset from a radial axis both in a downward direction and also offset from extending directly toward the longitudinal center line. The second inlet guard rod first end is displaced about the annular sleeve from the first inlet guard rod first end. A third inlet guard rod terminates at a first end affixed with and protruding interiorly from the drain tile inlet coupler annular sleeve and terminates at a second end distal to the first end. A sloping portion between the first end and the second end is offset from a radial axis both in a downward direction and also offset from extending directly toward the longitudinal center line. The third inlet guard rod first end is displaced about the annular sleeve from the first inlet guard rod first end and from the second inlet guard rod first end. A fourth inlet guard rod terminates at a first end affixed with and protruding interiorly from the drain tile inlet coupler annular sleeve and terminates at a second end distal to the first end. A sloping portion between the first end and the second end is offset from a radial axis both in a downward direction and also offset from extending directly toward the longitudinal center line. The fourth inlet guard rod first end is displaced about the annular sleeve from the first, second, and third inlet guard rod first ends. The first inlet guard rod second end terminates most nearly adjacent to the second inlet guard rod at a location most nearly adjacent to a point intermediate between the first and second ends of the second inlet guard rod, and is spaced therefrom by an amount sufficient to allow harmless debris to slide off of the first inlet guard rod second end. The second inlet guard rod second end terminates most nearly adjacent to the third inlet guard rod at a location most nearly adjacent to a point intermediate between the first and second ends of the third inlet guard rod, and is spaced therefrom by an amount sufficient to allow harmless debris to slide off of the second inlet guard rod second end. The third inlet guard rod second end terminates most nearly adjacent to the fourth inlet guard rod at a location most nearly adjacent to a point intermediate between the first and second ends of the fourth inlet guard rod, and is spaced therefrom by an amount sufficient to allow harmless debris to slide off of the third inlet guard rod second end. The fourth inlet guard rod second end terminates most nearly adjacent to the first inlet guard rod at a location most nearly adjacent to a point intermediate between the first and second ends of the first inlet guard rod, and is spaced therefrom by an amount sufficient to allow harmless debris to slide off of the fourth inlet guard rod second end.

OBJECTS OF THE INVENTION

Exemplary embodiments of the present invention solve inadequacies of the prior art by providing a drive-over tile intake guard that encompasses the end of and extends interior of a drain tile pipe. The present drive-over tile intake guard has a plurality of rods each that extend generally toward the center of the tile opening, but each which are angularly offset from radial therewith. By angularly offsetting the rods each in the same direction, smaller debris that might block flow through the guard but which will not block the drain tile from functioning will swirl and ultimately pass into the drain tile. Other debris and larger crop residue will tend to float on top of the water in the field. Since the guard is low, the water will be primarily drawn from the bottom. Rather than entangle with the guard, floating debris will instead tend to entangle with surrounding grass and weeds. Larger debris such as sticks, stones, and the like will be prevented from entering the drain tile. As may be apparent, in environments and situations where such sticks and stones are commonly lodged into the guard, the guard may require infrequent cleaning, but typically far less frequently than that of the prior art.

The present invention and the preferred and alternative embodiments have been developed with a number of objectives in mind. While not all of these objectives might be found in every embodiment, these objectives nevertheless provide a sense of the general intent and the many possible benefits that are available from embodiments of the present invention.

A first object of the invention is to provide a drain tile guard that selectively allows harmless debris to pass into the drain tile, while blocking debris and animals that may harm the drain tile. A second object of the invention is to provide a drain tile guard that may be driven over with agricultural equipment, without fear of harm or destruction to either the guard, the top of the drain tile, or the agricultural equipment. Another object of the present invention is to provide a drain tile guard that will allow water to be drawn from the bottom or near to the field, rather than shifting upward over time. A further object of the invention is to provide a drain tile guard that is safe for use in areas that livestock might traverse. Yet another object of the present invention is to provide a drain tile guard that is manufactured readily using few piece parts, and which is simultaneously easy to install and use.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
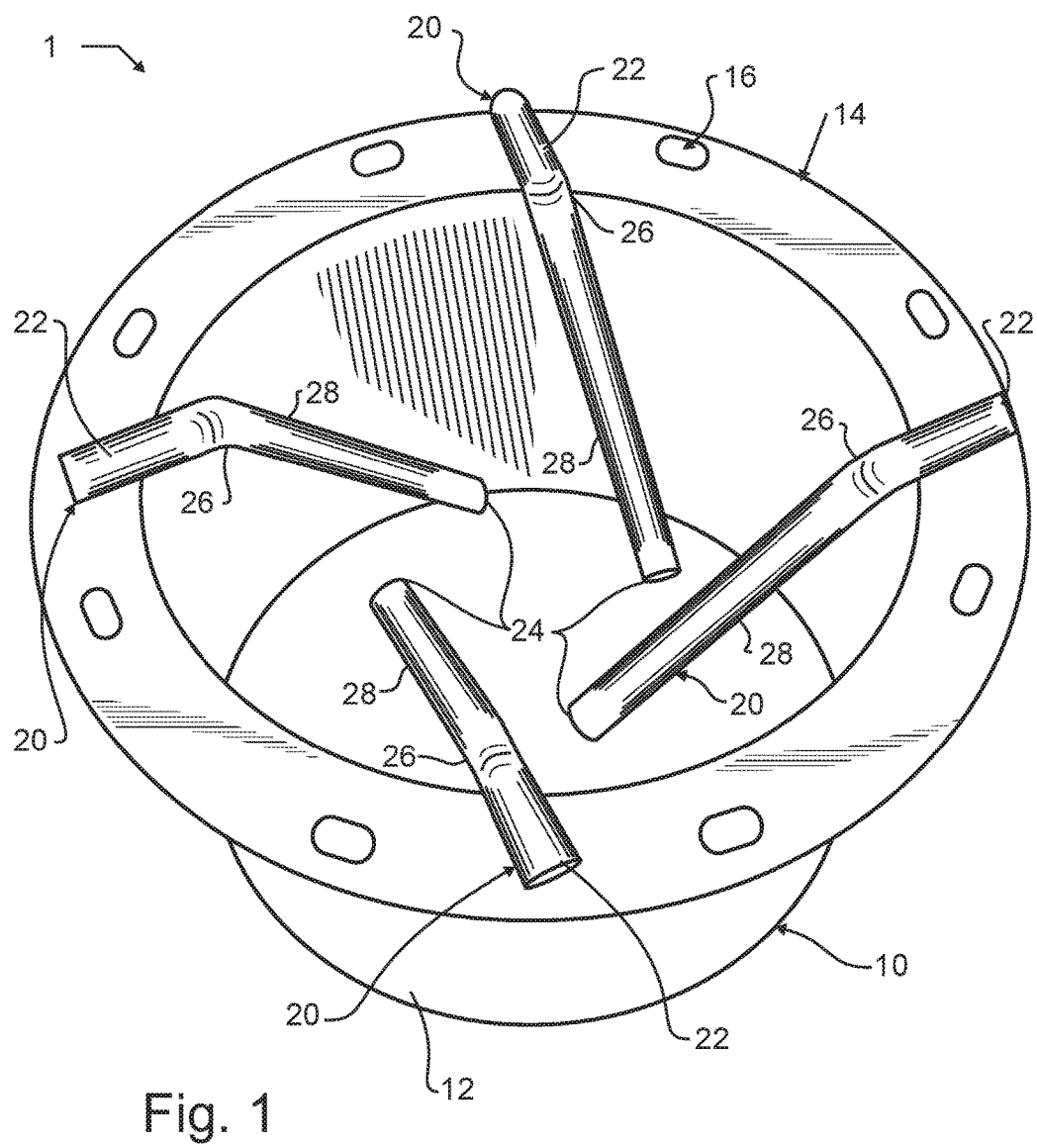
FIGS. 1-3 illustrate a preferred embodiment drive-over tile intake guard designed in accord with the teachings of the present invention from projected, top, and side views, respectively.
Figure 2:
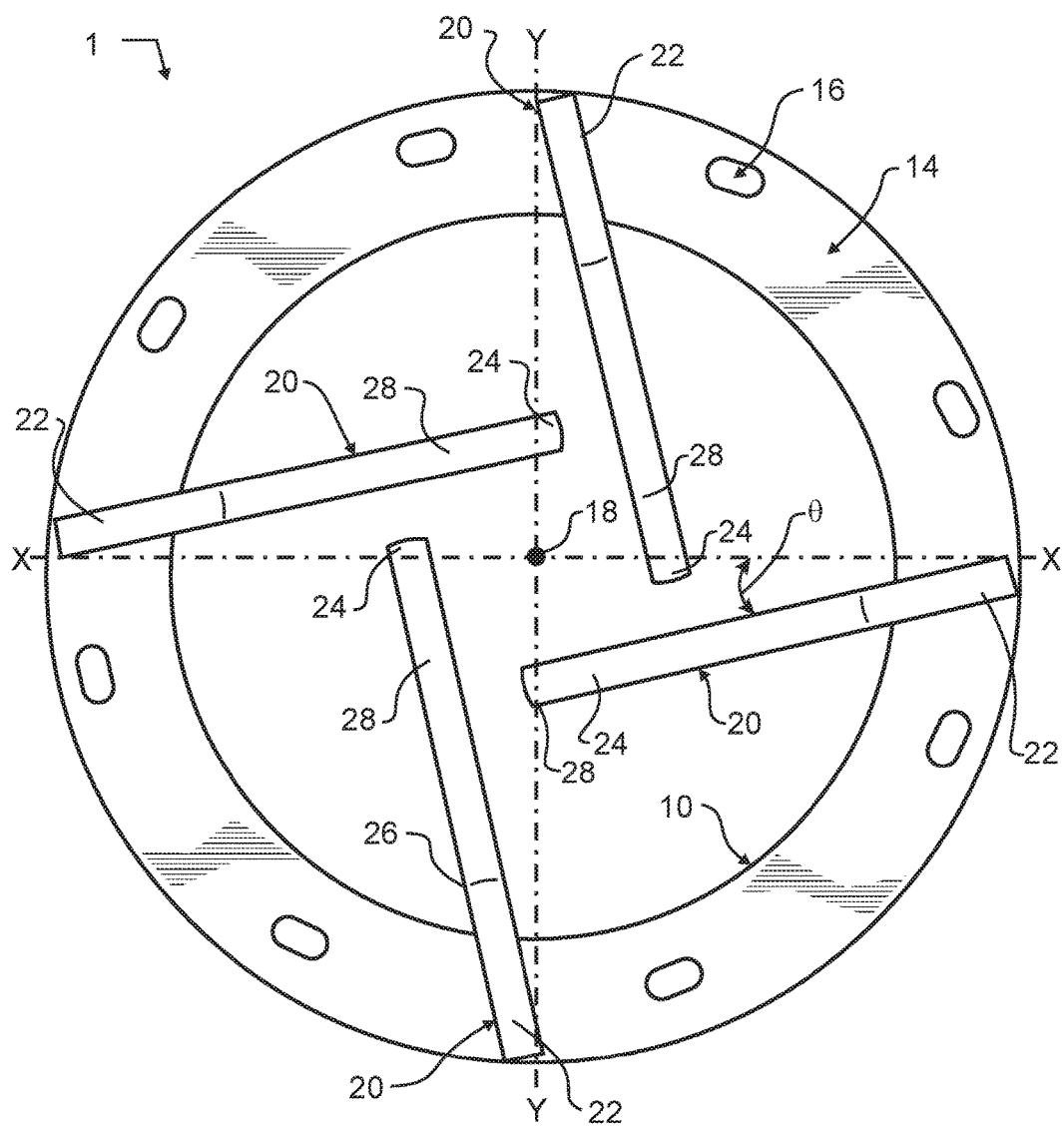

Manifested in the preferred and alternative embodiments, the present invention provides a drive-over drain tile intake guard 1 that rests immediately upon the top lip of a drain tile inlet, adjacent to the earth surface, and provides mechanical reinforcement to the drain tile upper lip. In a preferred embodiment of the invention illustrated in FIGS. 1-3, drive-over tile intake guard 1 is comprised of a drain tile inlet coupler 10 having a plurality of inlet guard rods 20 protruding toward an interior of inlet coupler 10. Drain tile inlet coupler 10 is configured to engage with the earth and a drain tile inlet to provide secure anchoring. Most preferably, in the event farm machinery or larger animals were to contact preferred embodiment drive-over tile intake guard 1, they will pass over the top thereof without harming the drain tile inlet, drive-over intake guard 1, or the machinery or livestock. Inlet guard rods 20 are configured to keep out birds, larger animals such as skunks and raccoons, larger sticks, and other objects that can clog the drain tile, while allowing smaller debris such as leaves and straw to pass through and not become tangled with or clog drive-over intake guard 1.

Drain tile inlet coupler 10 includes a sleeve 12 terminating adjacent a top end at a flange 14. In preferred embodiment drive-over tile intake guard 1, sleeve 12 is sized to fit outside of and circumscribe the exterior of drain tile tubing. As can be appreciated from FIGS. 1 and 3, the combination of sleeve 12 and flange 14 in preferred embodiment drive-over tile intake guard 1 form an "L" shape in cross-section taken along a vertical plane.

Flange 14 rests on top of the earth, and inlet guard rods 20 spiral down into the interior of the end of the drain tile tube. By circumscribing the drain tile inlet, preferred embodiment drive-over tile intake guard 1 will absorb the primary force of a vehicle wheel passing there over, and will transmit that force directly into the ground. As a result, neither the preferred embodiment drive-over tile intake guard 1 nor the drain tile inlet will be harmed.

However, in alternative embodiments contemplated herein, sleeve 12 may be sized to fit within the interior of drain tile tubing, and in such alternative embodiments flange 14 may rest on top of the end of the drain tile tube. In further alternative embodiments such as illustrated herein in FIG. 4, sleeve 12 may be replaced by or augmented with a wire frame, as may be desired. In either case, sleeve 12 will most preferably provide sufficient strength to withstand substantial forces applied to the unsupported ends of inlet guard rods 20, such as may occur when livestock or the like steps into the interior of sleeve 12.

In preferred embodiment drive-over tile intake guard 1, at least two and preferably four or even more inlet guard rods 20 are provided that are securely affixed to flange 14. These inlet guard rods 20 are preferably spaced in equal angular increments about inlet coupler 10. Consequently, in preferred embodiment drive-over tile intake guard 1 where four inlet guard rods 20 are provided, the first ends 22 are affixed at approximately ninety degree intervals about inlet coupler 10. As may be apparent, three inlet guard rods 20 would preferably be spaced at approximately 120 degree intervals, while five would be spaced at approximately 72 degree intervals.

For exemplary purposes, when steel is used to fabricate preferred embodiment drive-over tile intake guard 1, inlet guard rods may be welded directly to flange 14 as illustrated. Nevertheless, in alternative embodiments contemplated herein, inlet guard rods 20 may be affixed on the underside of flange 14, or may be affixed directly to sleeve 12. As may be apparent though, in those embodiments where the inlet guard rods 20 are affixed on the underside of flange 14 the drain tile inlet must be lowered sufficiently to accommodate the diameter of inlet guard rods 20, or thickness thereof if non-cylindrical material is used to fabricate rods 20 in a further alternative. Otherwise, flange 14 will be undesirably raised above the surface of the earth.

Preferably either immediately or otherwise very shortly after first end 22 separates from flange 14, there is a significant downturn or bend 26 that then defines a second downward sloping and skewed portion 28 of each inlet guard rod 20. Downward sloping and skewed portion 28 terminates at a second end 24 distal to first end 22, preferably without any additional couplings or connection along the length of downward sloping and skewed portion 28, and without any surface irregularities or discontinuities. Inlet guard rods 20 are thereby cantilevered from flange 14.

In addition to the downturn, each one of inlet guard rods 20 is preferably offset or skewed slightly from extending in a perfect radial direction inward from either flange 14 or sleeve 12 to a center longitudinal axis 18 of sleeve 12. As best illustrated from the top view of FIG. 2, the first end 22 of inlet guide rods 20 is angularly offset from radial by an angle θ determined in part by the number and length of rods 20, and in part by the inside diameter of flange 14 and sleeve 12. This angle θ is referred to herein as the skew, which is separate from an in addition to the downward slope. In preferred embodiment drive-over tile intake guard 1, this angle θ is approximately fifteen degrees. This angular offset covers the opening more evenly with fewer rods.

In preferred embodiment drive-over tile intake guard 1, each one of inlet guard rods 20 is of a length sufficient to reach longitudinal center line 18 within said drain tile inlet coupler 10, if it extended directly radially. However, as best understood from FIG. 2, the downward sloping and skewed portion 28 instead extends somewhat away from longitudinal center line 18, creating the small gap between each one of ends 24 and an adjacent downward sloping and skewed portion 28.

The lack of any couplings along downward sloping and skewed portion 28, in combination with a smooth and rounded cross-sectional geometry and the downward orientation, helps to ensure that any grass or straw that enters into the interior of sleeve 12 will be allowed to slide down the downward sloping and skewed portion 28 of inlet guard rods 20. Flow of water into preferred embodiment drive-over tile intake guard T will cause the grass or straw to flex around the downward sloping and skewed portion 28. Grass or straw will then eventually, if not immediately, spiral with the incoming water and slide off of the second end 24, passing through between second end 24 and an adjacent one of the rod downward sloping and skewed portions 28, into the drain tile. From there, the grass and straw will be carried away by the water and eventually released at the drain tile outlet. Consequently, with smaller debris such as grass, straw, or leaves, preferred embodiment drive-over tile intake guard 1 is self-cleaning. Noteworthy here is that, absent any sticks or other obstacles inside the drain tile for the grass or straw to wrap about, the grass, straw, and leaves will pass entirely through the drain tile and will not contribute materially to clogging therein.

Any more rigid and durable matter of size great enough to clog the drain tile, such as a stick or branch, will be blocked by the overlapping arrangement of the free ends 24 of downward sloping and skewed portions 28. Due to the self-cleaning nature of preferred embodiment drive-over tile intake guard 1, there will not be an accumulation of grass and straw that would block the intake of water into the drain tile tubing, unless or until sufficient sticks or branches have accumulated to collect such straw or grass. In other words, preferred embodiment drive-over tile intake guard 1 will only clog when sufficient sticks have accumulated. This is exactly the purpose of preferred embodiment drive-over tile intake guard 1, since if those same sticks were to pass into the drain tile tube and become lodged therein, they would collect grass, straw, and other debris, and eventually block the flow of water through the drain tile tube. Instead, these sticks are being captured by preferred embodiment drive-over tile intake guard 1 at the soil surface, where they are readily accessible and can be periodically removed. Since the sticks are the primary objects being captured, and not the straw or grass, the need for periodic servicing is much less frequent than with prior art drain tile inlet guards.

While not necessary to the proper operation of the present invention, and generally of no further benefit, one or more optional holes 16 may be provided around the perimeter of flange 14. In such instance, stakes or other apparatus may be used to provide additional anchoring.

Figure 3:
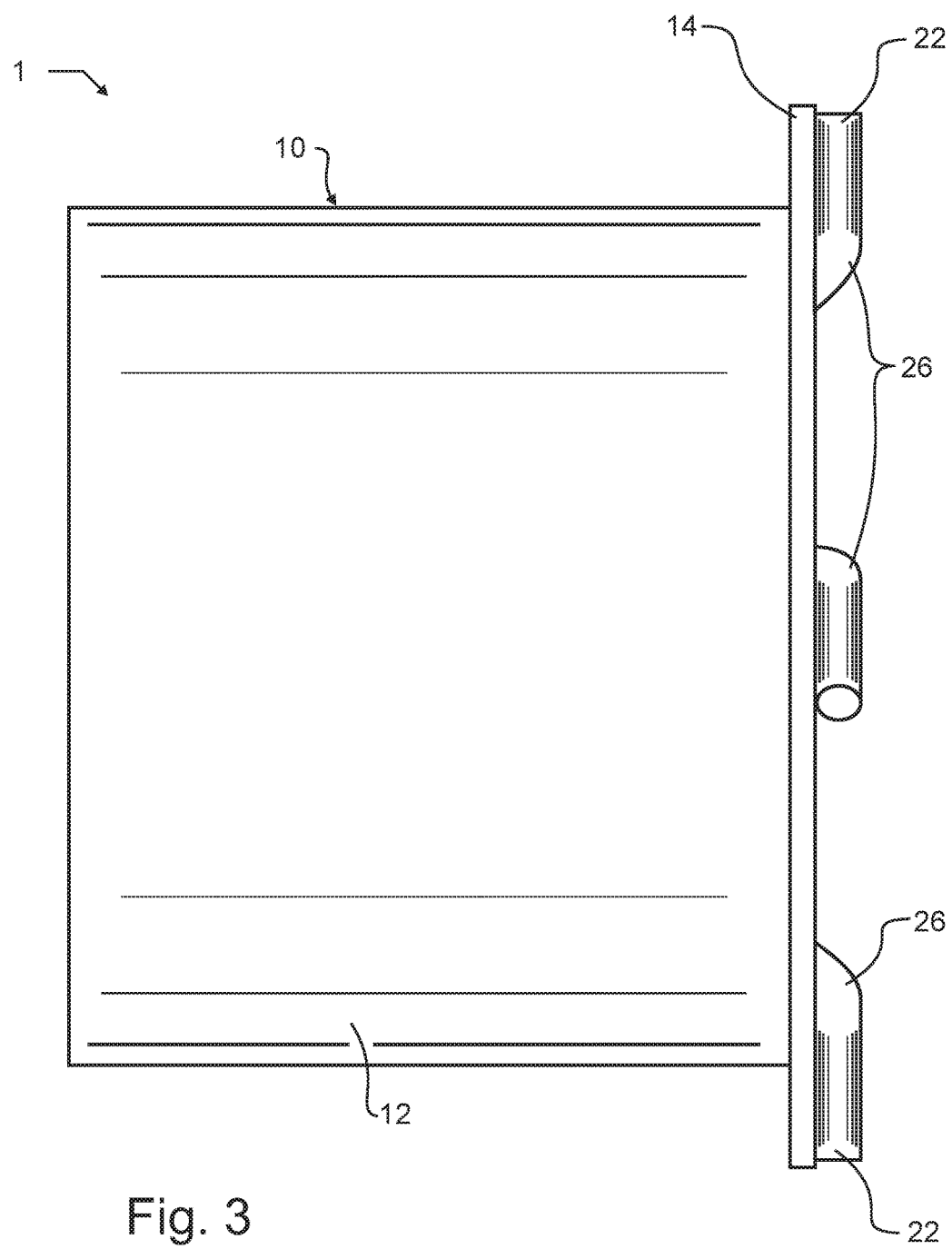

Flange 14 is in preferred embodiment drive-over tile intake guard 1 generally planar, as visible in FIG. 3. This allows flange 14 to lay flat on the ground surface. However, in alternative embodiments flange 14 is slightly conical in some embodiments tapered slightly upward and in other embodiments tapered slightly downward, the direction which will be selected by a designer. A slight upward convex cone causes the outer diameter of flange 14 to contact the earth surface first, and causes it to drive slightly into the earth. In the event other objects come into contact with flange 14, they will more likely be pushed up and above flange 14 by this slight upward cupping. In contrast, an alternative embodiment downward or concave cone allows inlet guard rod first ends 22 to be flush with or below the surface of the earth, but flange 14 is more abrupt, increasing the chances of other objects snagging the flange. Additionally, a downward cone also requires the drain tile tube to be shortened to be subsurface, to accommodate the inlet guard.

Where desired, in an alternative embodiment inlet guard rod first ends 22 are ground, flattened, or otherwise configured to gradually increase in thickness from the outer edge of flange 14 toward the inner edge of flange 14. This requires more manufacturing expense, but in turn provides a more gently sloped outer edge, such that if other objects such as field hoses or the like come into contact with these inlet guard rod first ends 22, they will easily slide up and over. Similarly, any debris carried by the wind will also be more prone to blow past, and not become entangled with preferred embodiment drive-over tile intake guard 1.

In additional alternative embodiments contemplated herein, sleeve 12 may be provided with one or more rods extending longitudinally therewith, or in further alternatives radially or at other angles, to provide additional ground anchoring capability. Likewise, in alternative embodiments the diameter of flange 14 may be increased, which provides similar more secure engagement with the surface of the earth.

As may be apparent then, preferred embodiment drive-over tile intake guard 1 may be driven over without harm to either the machinery or to the guard or drain tile. As a result, when a field is being planted, sprayed, or harvested, a machinery operator does not need to be concerned about the location of preferred embodiment drive-over tile intake guard 1. During planting, the discs used to create the seed furrow will rise over drive-over tile intake guard 1 without damage to the guard or the planting equipment. Consequently, where so equipped the operator may rely on a GPS navigation system, without need to divert the machinery.

In further alternative embodiments, a flag or other indicator is affixed with preferred embodiment drive-over tile intake guard 1 to ensure that the machine operator sees the guard. As noted, this flag is only beneficial at the time of planting, and can be detrimental later, since the flag can be snagged by and potentially interfere with or damage harvesters. Consequently, if a flag or the like is used, it will most preferably be removable and will be removed subsequent to planting.

Preferred embodiment drive-over tile intake guard 1 may be designed to be safe with livestock. As noted above, sleeve 12 will most preferably provide sufficient strength to withstand substantial forces applied to the unsupported ends of inlet guard rods 20, such as may occur when livestock or the like steps into the interior of sleeve 12. As long as both sleeve 12 and inlet guard rods 20 are fabricated to provide the requisite strength, and as long as the largest openings within the interior of sleeve 12 are smaller than livestock hooves, then drive-over tile intake guard 1 may be safely used with the livestock.

From the foregoing figures and description, several additional features and options become more apparent. First of all, drive-over tile intake guard 1 may be manufactured from a variety of materials, including metals, resins and plastics, ceramics or cementitious materials, or even combinations or composites of the above. The specific material used may vary, though special benefits are attainable if several important factors are taken into consideration. First, inlet guard rods 20 will preferably be sufficiently strong so as to support any anticipated load, such as a livestock hoof. Furthermore, it is preferable that all materials are sufficiently tough and durable to not fracture, even when great forces are applied thereto. A preferred material is mild steel, though stainless or other steel alloys, aluminum, composites such as fiber-reinforced resins, or other relatively higher strength materials are most preferred.

Several embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Figure 4:
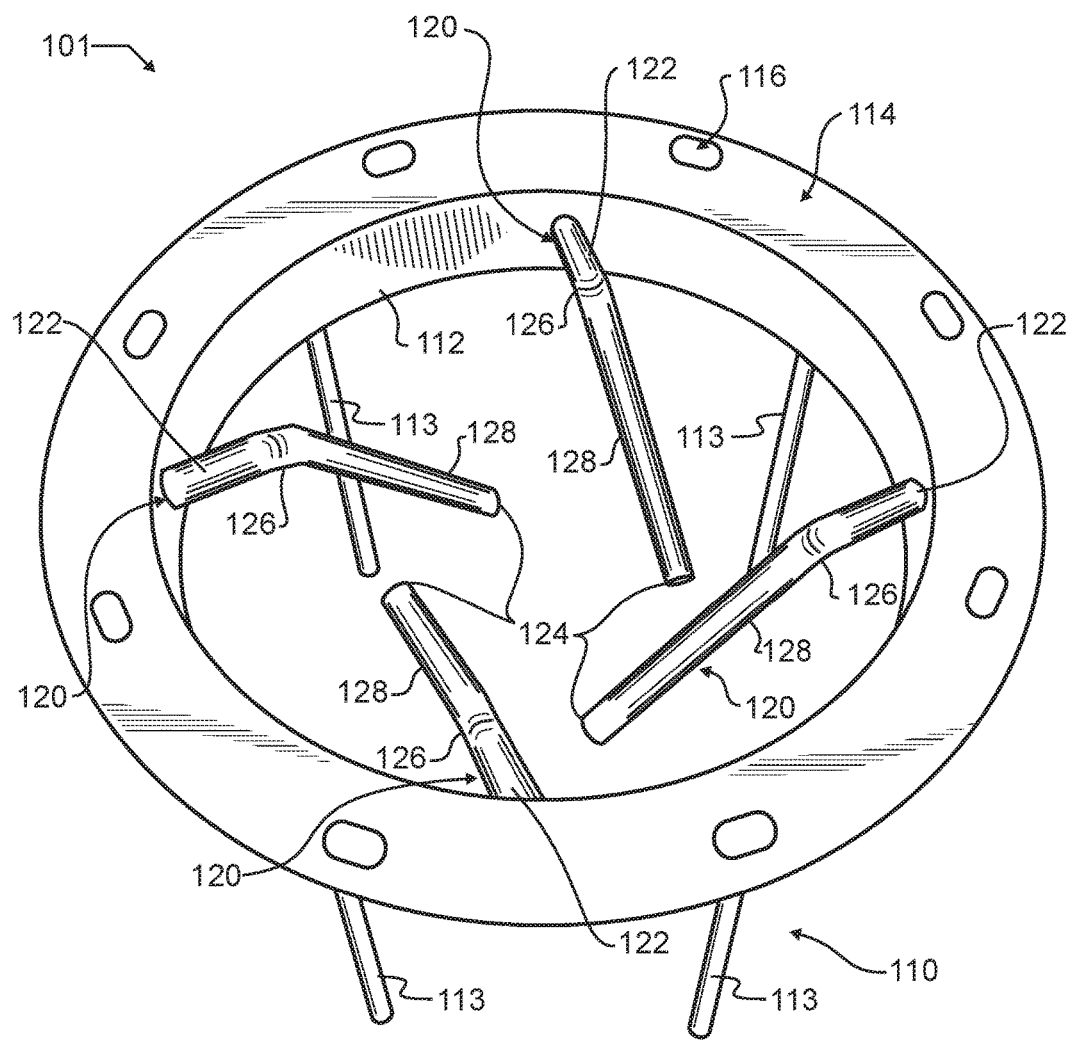
FIG. 4 illustrates a first alternative embodiment drive-over tile intake guard designed in accord with the teachings of the present invention from projected view.

FIG. 4 illustrates alternative embodiment drive-over tile intake guard 101 that incorporates several alternative embodiment features described herein above. In alternative embodiment drive-over tile intake guard 101, sleeve 112 has been substantially shortened. Rather than relying on sleeve 112 as the primary ground anchor, a plurality of rods 113 have been provided that extend longitudinally with and much farther than sleeve 112. Rods 113 provide much easier ground piercing and removal, while reducing weight and materials used to fabricate alternative embodiment drive-over tile intake guard 101.

In addition, inlet guard rods 120 terminate at first end 122 directly in the inside wall of sleeve 112, and are welded or otherwise rigidly affixed thereto. By terminating inlet guard rods 120 in the inside wall of sleeve 112, these inlet guard rods 120 do not rise above the top of flange 114, and so will not snag machinery, hoses, or other agricultural equipment.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A drive-over tile intake guard configured to protect an inlet into a longitudinally extensive drain tile pipe, comprising:
   a drain tile inlet coupler configured for earth insertion adjacent to said drain tile pipe inlet; and
   a plurality of inlet guard rods, each one of said plurality of inlet guard rods terminating at a first end affixed with and protruding interiorly from said drain tile inlet coupler and terminating at a second end distal to said first end, and having a downward sloping portion between said first end and said second end;
   said downward sloping portion of each one of said plurality of inlet guard rods configured to displace said second end relatively more interior within a drain tile inlet; and
   said downward sloping portion of each one of said plurality of inlet guard rods additionally angularly offset from extending toward a longitudinal center line within said drain tile inlet coupler;
   each one of said plurality of inlet guard rod downward sloping portions having an offset angle relative to a radial axis of a like direction and magnitude.

2. The drive-over tile intake guard of claim 1, wherein each one of said plurality of inlet guard rod second ends terminate most nearly adjacent to an immediately adjacent one of said plurality of inlet guard rods at a location most nearly adjacent to a point intermediate between said first and second ends of said immediately adjacent one of said plurality of inlet guard rods, and spaced therefrom by an amount sufficient to allow harmless debris to slide off of said second end of each one of said plurality of inlet guard rods.

3. The drive-over tile intake guard of claim 1, wherein each one of said plurality of inlet guard rods has a length sufficient to reach said longitudinal center line within said drain tile inlet coupler but for said angular offset.

4. The drive-over tile intake guard of claim 1, wherein said drain tile inlet coupler further comprises an annular sleeve configured to pierce the earth and circumscribe said longitudinally extensive drain tile pipe inlet.

5. The drive-over tile intake guard of claim 4, wherein said drain tile inlet coupler further comprises a flange terminating said annular sleeve and extending generally radially outward therefrom.

6. The drive-over tile intake guard of claim 5, wherein said drain tile inlet coupler further comprises an L-shaped cross section taken along a vertical plane.

7. The drive-over tile intake guard of claim 6, further comprising a plurality of ground-piercing rods extending longitudinally from said inlet coupler, each of said plurality of ground-piercing rods configured to pierce the earth around said drain tile inlet.

8. The drive-over tile intake guard of claim 5, wherein each one of said plurality of inlet guard rod first ends is affixed to said flange.

9. The drive-over tile intake guard of claim 4, wherein each one of said plurality of inlet guard rod first ends is affixed to an interior wall of said annular sleeve.

10. The drive-over tile intake guard of claim 4, wherein said plurality of inlet guard rod first ends are spaced at approximate ninety degree increments about said annular sleeve longitudinal axis.

11. A drive-over tile intake guard, comprising:
a drain tile inlet coupler defining a longitudinal center line within said drain tile inlet coupler and having an annular sleeve configured for earth insertion adjacent to a drain tile pipe inlet and having a flange configured to rest upon an earth surface adjacent to said drain tile pipe inlet;
a first inlet guard rod terminating at a first end affixed with and protruding interiorly from said drain tile inlet coupler annular sleeve and terminating at a second end distal to said first end, and a sloping portion between said first end and said second end, said sloping portion offset from a radial axis both in a downward direction and also offset from extending directly toward said longitudinal center line;
a second inlet guard rod terminating at a first end affixed with and protruding interiorly from said drain tile inlet coupler annular sleeve and terminating at a second end distal to said first end, and a sloping portion between said first end and said second end, said sloping portion offset from a radial axis both in a downward direction and also offset from extending directly toward said longitudinal center line, said second inlet guard rod first end displaced about said annular sleeve from said first inlet guard rod first end;
a third inlet guard rod terminating at a first end affixed with and protruding interiorly from said drain tile inlet coupler annular sleeve and terminating at a second end distal to said first end, and a sloping portion between said first end and said second end, said sloping portion offset from a radial axis both in a downward direction and also offset from extending directly toward said longitudinal center line, said third inlet guard rod first end displaced about said annular sleeve from said first inlet guard rod first end and from said second inlet guard rod first end;
a fourth inlet guard rod terminating at a first end affixed with and protruding interiorly from said drain tile inlet coupler annular sleeve and terminating at a second end distal to said first end, and a sloping portion between said first end and said second end, said sloping portion offset from a radial axis both in a downward direction and also offset from extending directly toward said longitudinal center line, said fourth inlet guard rod first end displaced about said annular sleeve from said first, second, and third inlet guard rod first ends;
said first inlet guard rod second end terminating most nearly adjacent to said second inlet guard rod at a location most nearly adjacent to a point intermediate between said first and second ends of said second inlet guard rod, and spaced therefrom by an amount sufficient to allow harmless debris to slide off of said first inlet guard rod second end;
said second inlet guard rod second end terminating most nearly adjacent to said third inlet guard rod at a location most nearly adjacent to a point intermediate between said first and second ends of said third inlet guard rod, and spaced therefrom by an amount sufficient to allow harmless debris to slide off of said second inlet guard rod second end;
said third inlet guard rod second end terminating most nearly adjacent to said fourth inlet guard rod at a location most nearly adjacent to a point intermediate between said first and second ends of said fourth inlet guard rod, and spaced therefrom by an amount sufficient to allow harmless debris to slide off of said third inlet guard rod second end; and
said fourth inlet guard rod second end terminating most nearly adjacent to said first inlet guard rod at a location most nearly adjacent to a point intermediate between said first and second ends of said first inlet guard rod, and spaced therefrom by an amount sufficient to allow harmless debris to slide off of said fourth inlet guard rod second end.

12. The drive-over tile intake guard of claim 11, wherein said drain tile inlet coupler further comprises an L-shaped cross section taken along a vertical plane.

13. The drive-over tile intake guard of claim 11, further comprising a plurality of ground-piercing rods extending longitudinally from said inlet coupler, each of said plurality of ground-piercing rods configured to pierce the earth around said drain tile inlet.

14. The drive-over tile intake guard of claim 11, wherein each one of said first, second, third, and fourth inlet guard rod first ends is affixed to an interior wall of said annular sleeve.

15. The drive-over tile intake guard of claim 11, wherein each one of said first, second, third, and fourth inlet guard rod first ends is affixed to said flange.

16. The drive-over tile intake guard of claim 11, wherein said first, second, third, and fourth inlet guard rod first ends are spaced at approximate ninety degree increments about said annular sleeve longitudinal axis.

* * * * *